(12) United States Patent
Ahmadvand

(10) Patent No.: US 6,477,670 B1
(45) Date of Patent: Nov. 5, 2002

(54) DATA LINK LAYER QUALITY OF SERVICE FOR UMTS

(75) Inventor: Nima Ahmadvand, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/432,567

(22) Filed: Nov. 12, 1999

Related U.S. Application Data

(63) Continuation-in-part of application No. 09/239,545, filed on Jan. 29, 1999.

(51) Int. Cl.[7] .................. G01R 31/28; H04B 7/005; H04J 3/16
(52) U.S. Cl. .................. 714/712; 370/469; 370/278
(58) Field of Search .................. 714/712, 768, 714/701, 713, 43, 46; 370/248, 912, 913, 351, 357, 359, 360, 469, 466, 347, 349, 395, 278, 280

(56) References Cited

U.S. PATENT DOCUMENTS

| | | | | |
|---|---|---|---|---|
| 5,058,108 A | * | 10/1991 | Mann et al. | 370/409 |
| 5,168,497 A | * | 12/1992 | Ozaki et al. | 370/394 |
| 5,629,948 A | | 5/1997 | Hagiwara et al. | 371/32 |
| 5,715,257 A | | 2/1998 | Matsuki et al. | 371/32 |
| 5,726,764 A | | 3/1998 | Averbuch et al. | 358/403 |

FOREIGN PATENT DOCUMENTS

| | | | | |
|---|---|---|---|---|
| WO | WO 97/00568 | 1/1997 | | H04L/12/28 |

* cited by examiner

Primary Examiner—Christine T. Tu

(57) ABSTRACT

A Data Link Layer (DLL) protocol for direct support of the Internet Protocol (IP) networking in the Universal Mobile Telecommunications System (UMTS), is provided. The disclosed Data Link Layer comprises a Radio Link Control (RLC) sublayer and a Medium Access Control (MAC) sublayer. At a transmit end, as well as at a receiving end of the UMTS wireless system, a plurality of Quality of Service (QoS) planes are created according to IP QoS requirements. At the RLC level, each QoS plane comprises a Data-RLC and a Control-RLC. The QoS planes are optimized to handle the QoS requirements of a corresponding Class of Service (CoS). At the transmitting end, the data packets received from the upper layers are directed to a QoS plane according to the particular QoS information they contain, and processed according to their particular QoS requirement. A Segmentation, Concatenation, and Reframing module (SCR) is used to generate variable size RLC frames, including multiframing. The variable size RLC frames are transmitted to the MAC sublayer using logical channels. At the MAC sublayer, the RLC frames are multiplexed onto transport channels based on their QoS requirements and transmitted to the physical layer for propagation to the receiving end.

20 Claims, 3 Drawing Sheets

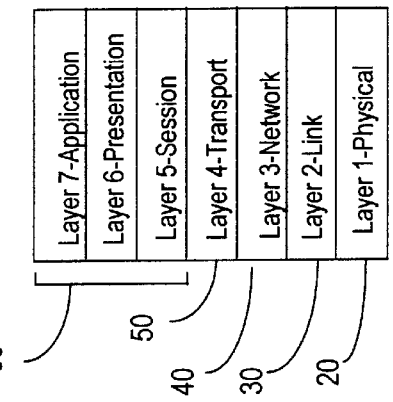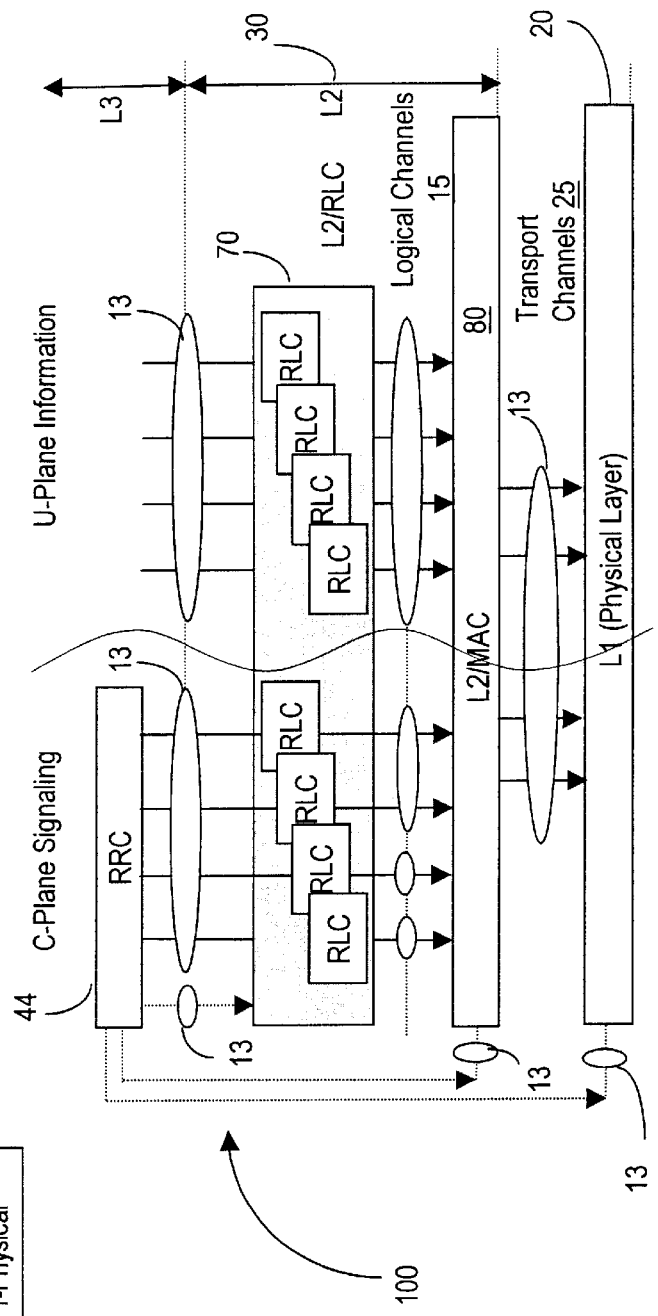

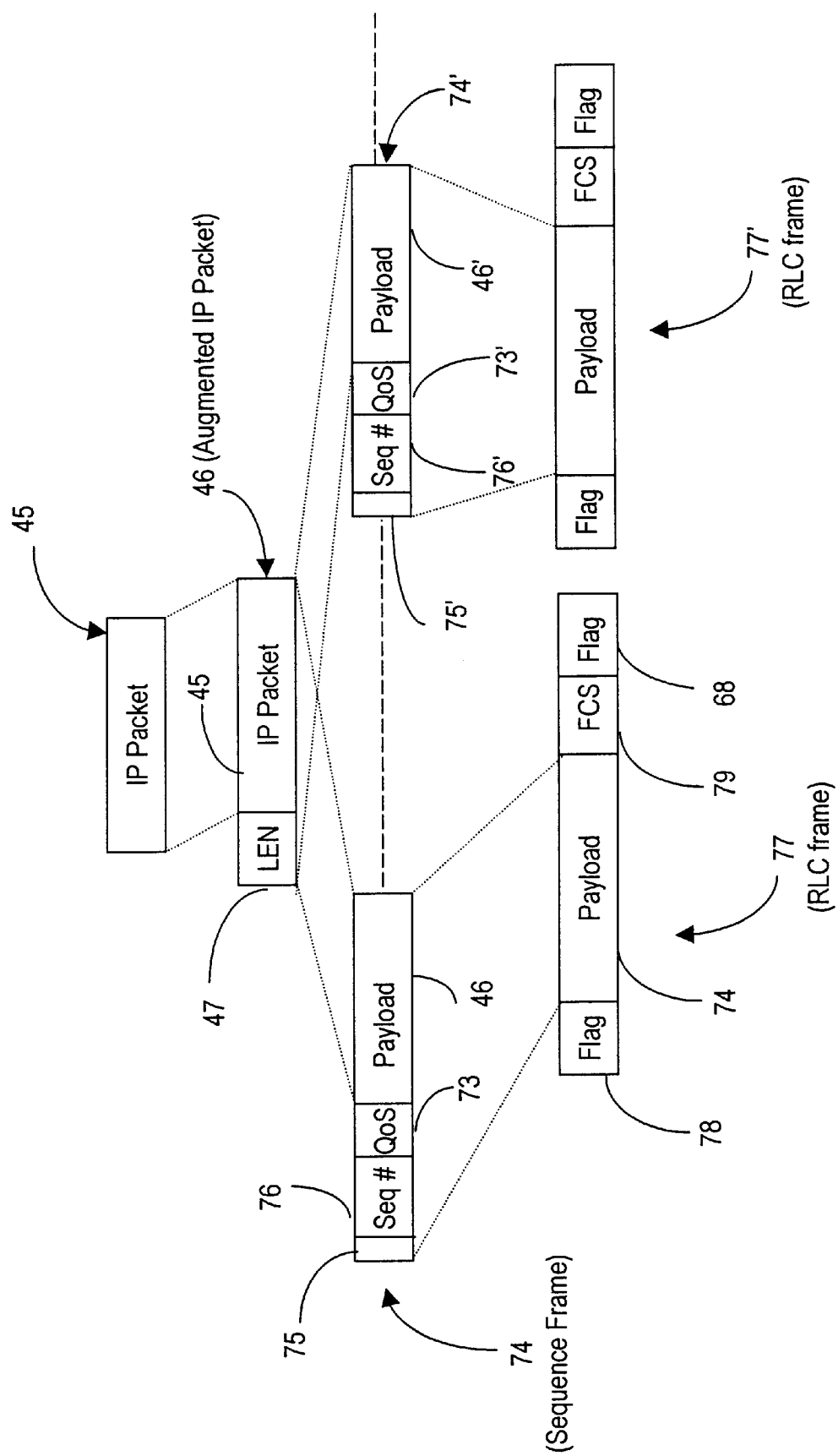

DATA LINK LAYER QUALITY OF SERVICE FOR UMTS

This application is a Continuation-in Part of U.S. Ser. No. 09/239,545 filed Jan. 29, 1999.

BACKGROUND OF THE INVENTION

1. Field of the Invention

The present invention relates generally to Data Link Layer (DLL) protocols, and more particularly to a DLL protocol for direct support of network layer protocol data services, i.e. the Internet Protocol (IP), for the Universal Mobile Telecommunications System (UMTS).

1. Description of the Related Art

Layered architecture is a form of hierarchical modularity used in data network design. All major emerging communication network technologies rest on the Open System Interconnections (OSI) layer architecture of the International Organization for Standardization (ISO), illustrated in FIG. 1. In this architecture, a layer performs a category of functions or services. The OSI model defines a Physical Layer (Layer 1) which specifies the standards for the transmission medium, a Data Link Layer (Layer 2), a Network Layer (Layer 3), a Transport Layer (Layer 4) and Application Layers (Layers 5 to 7).

Data Link Control protocols are used to mitigate the effects of impairments introduced by the physical transmission medium. A Data Link Control protocol is designed to deal specifically with the types of impairments found on the radio link and comprises mechanisms to deal with errors on the communications link, delays encountered in transmitting information, lost information, bandwidth conservation, and contention resolution.

The third layer is the Network Layer which implements routing and flow control for the network.

The fourth layer, Transport Layer, provides reliable and transparent transfer of data between end points. It also provides end-to-end error recovery and flow control. For the Internet based protocol model, the Transport Control Protocol (TCP) mainly corresponds to the Transport Layer of the OSI model.

Current wireless networks use layer 2–4 protocols designed specifically for the wired networks. However, there are some major differences between the wireless and the wired environment, resulting in important differences in the way these networks operate.

In a wired network the bit error rates are typically on the order of $10^{-9}$ or better, and errors and packet loss have a tendency to be random. Therefore, the wired transmission medium could be considered essentially error-free and the TCP data packets are lost mainly due to congestion in the intervening routers. Moreover, in a wired system the transmission channel has a constant bandwidth and is symmetrical, which means the characteristics of the channel in one direction can be deduced by looking at the characteristics of the channel in the other direction. Therefore, it is often easier to use a common link control protocols and to solve congestion problems by adding bandwidth.

On the other hand, in a wireless environment, most of these assumptions are no longer valid. The wireless channel is characterized by a high bit error rate. The errors occur in bursts that can affect a number of successive packets. Due to fading, low transmission power available to the User Equipment (UE), or the mobile station, and effects of interference, the radio link is not symmetrical and the bandwidth of a transmission channel rapidly fluctuates over time.

Furthermore, in a wireless environment, the amount of bandwidth available to the system is fixed and scarce. Adding bandwidth to the radio link may be expensive or even impossible due to regulatory constraints.

In addition, the issues in connection with increasing the transmission bandwidth are substantially different in the wireless environment. In a wired environment increasing the throughput is simply a matter of allocating as much bandwidth as possible to the connection. In a wireless environment, part of the bandwidth is used in error correction. More error correction means less payload. However, more error correction increases the probability of correct delivery without retransmissions. Thus, in the wireless environment increasing the end-to-end throughput may be obtained by reducing bandwidth assigned to payload and using the freed bandwidth for error correction.

The Data Link Layer (DLL) protocols available to date for wireless systems do not attempt to be inclusive as complete DLL protocols. Basically, off-the-shelf protocols intended for different media have been adopted for wireless systems. Even though some of those protocols are standardized, they are not very efficient for the wireless system. Also, some of the interactions between the non-wireless protocols and the communication system have caused a lot of complexities. For example, a point to point protocol (PPP) is currently used to conduct part of the functionality needed for the Data Link Layer (DLL). However, such a protocol imposes new limitations over the communication system. Moreover, for the DLL protocol to support the IP quality of service (IPQoS), the PPP encapsulation must be undone and this lowers the throughput.

Accordingly, there is a need for a specialized DLL protocol for a 3G wireless system which can satisfy the demand for advanced multimedia services in a UMTS environment, to support multiple concurrent voice, packet data, and circuit data services, each type of service having different QoS requirements.

SUMMARY OF THE INVENTION

It is an object of the present invention to provide a Data Link Layer (DLL) Quality of Service for UMTS which supports the Internet Protocol (IP), and to alleviate totally or in part the drawbacks of the prior art. This novel DLL removes the need for non-wireless data link protocols with their inherent limitations imposed. Furthermore, a Radio Link Control (RLC) sublayer according to the invention is capable of interfacing with the existing non-wireless Data Link Protocols.

It is another object of the present invention to provide a DLL for a wireless communication system, which supports IP Quality of Service (IPQoS) requirements for various advanced multimedia services in the UMTS environment.

According to one aspect of the present invention, there is provided a Data Link Layer (DLL) protocol for direct support of a network layer protocol in the Universal Mobile Telecommunications System (UMTS). The DDL protocol comprises; at a transmitting end of the UMTS, a plurality of Quality of Service (QoS) planes, each of the QoS planes processing a QoS oriented data packet according to a Quality of Service (QoS) requirement, and providing a radio link control (RLC) frame; a subflow processing module for receiving a network layer protocol data packet, converting the network layer protocol data packet into the QoS oriented data packet, and directing the QoS oriented data packet to one of the QoS planes according to QoS information in the network layer protocol data packet; and an interface between a Data Link Layer and a physical layer for receiving the RLC frame and transmitting same to the physical layer.

According to another aspect of the present invention, there is provided a method for direct processing a network layer protocol data packet for transmission over the UMTS wireless communication system. The method comprises the steps of: separating the radio link control layer of the wireless communication system into a plurality of Quality of Service (QoS) planes, each of the QoS planes processing a QoS oriented data packet according to a QoS requirement, and generating a radio link control (RLC) frame; processing the network layer protocol data packet by converting the network layer protocol data packet into the QoS oriented data packet and directing the QoS oriented data packet to one of said QoS planes according to QoS information in the network layer protocol data packet; and forwarding the RLC frame to a physical layer over a transport channel.

Advantageously, the Data Link Layer according to the invention, enables direct support of the IP networking and IP Quality of Service (IP QoS) in the wireless UMTS system by introducing the QoS planes to handle different QoS requirements.

The Data Link Layer according to the present invention removes the need for other non-wireless data link protocols, such as PPP, to connect to the IP.

Other aspects and features of the present invention will become apparent to those skilled in the art upon review of the following description of specific embodiments of the invention in conjunction with the accompanying figures.

DESCRIPTION OF THE DRAWINGS

FIG. 1 shows the OSI layers in general;

FIG. 2 shows the radio interface protocol architecture used with UMTS;

FIG. 4 illustrates the mapping of IP packets to RLC PDUs (RLC frames) according to the invention.

DETAILED DISCLOSURE OF THE EMBODIMENTS

Figure 3:
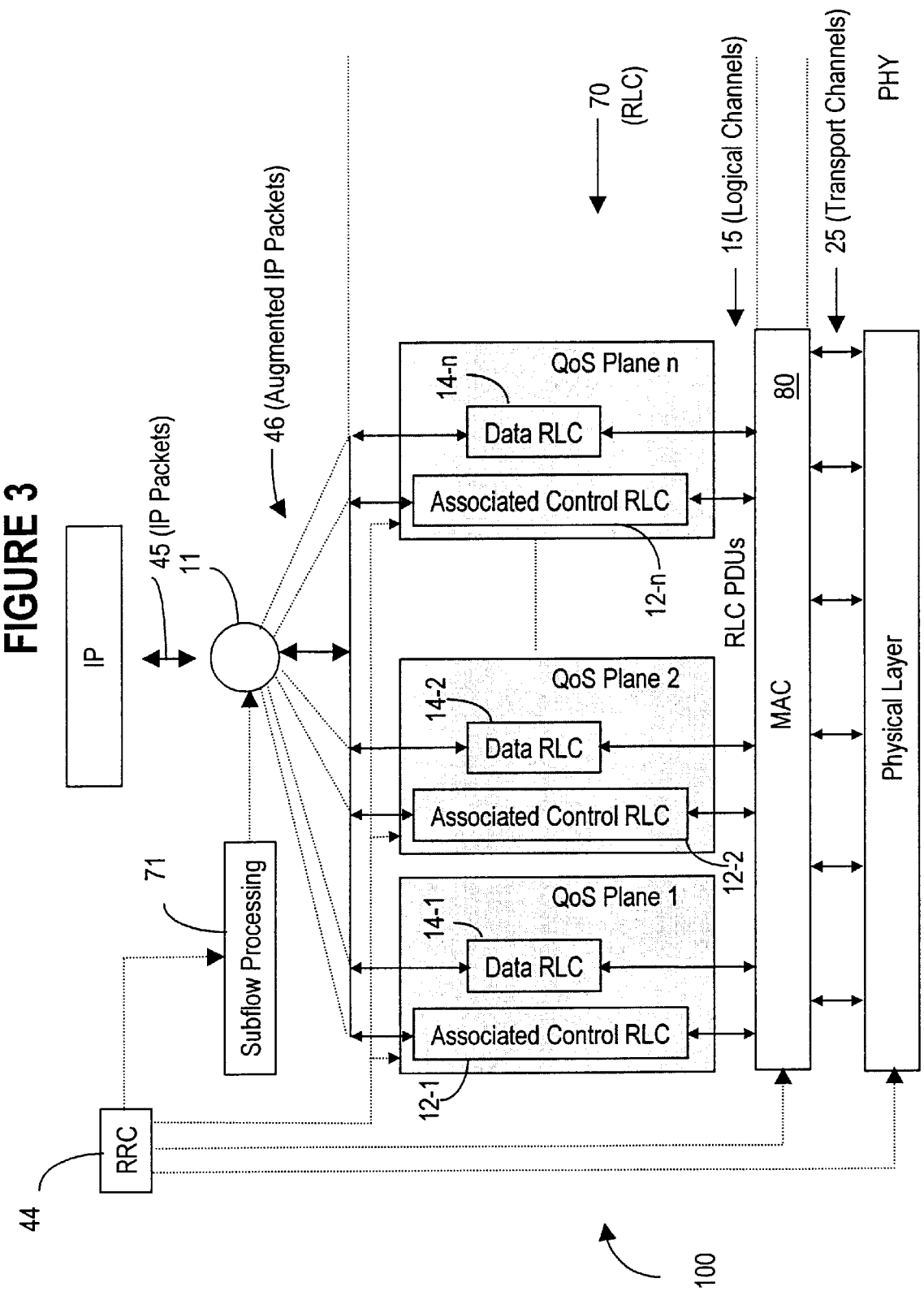
FIG. 3 is a block diagram of the Data Link Layer (DLL) protocol according to the invention.

The Data Link Layer (DLL) protocol according to the invention enables direct support of the IP networking in the Universal Mobile Telecommunications System(UMTS). This protocol supports various IP Quality of Service (IPQoS) and uses reconfigurable QoS planes. The Data Link Layer (DLL) protocol is designed to isolate the logical operation of the network from the physical medium.

Non-wireless Data Link Layer protocols(e.g. PPP), Network Layer protocols (e.g.IP), Transport Layer protocols (e.g. TCP), and the Application Layers are considered as "upper layer protocols" in the wireless protocol stack architecture, shown in FIG. 1.

The packet data traffic basically generated by a Transmission Control Protocol (TCP), a User Datagram Protocol (UDP), or other protocols such as Hyper Text Transport Protocol (HTTP), or Radio Transport Protocol (RTP), etc., would be encapsulated in IP packets and routed to the final destination. The routing of the IP packets is based on the IP address of the destination node. The Data Link Layer which resides below the Network Layer is responsible to deliver the IP packets received from the Network Layer, i.e. IP, to the Physical Layer.

A Network Layer protocol Quality of Service (QoS) may include "best effort", "expedited delivery", or "assured delivery". A Class of Service (CoS) defined at the Data Link Layer includes a set of services that have substantially the same QoS requirements.

Current second generation (2G) wireless systems are designed mostly to handle voice traffic, with some allowances for circuit-switched data. Later, packet data services were grafted onto the 2G systems but these are uniformly treated according to "best effort delivery" schemes. The type of the Radio Link Control used in 2G systems is typically based on the generic services available to the UE (User Equipment), as for example voice services, packet data services, and/or circuit switched data services.

For the third generation (3G) wireless communication systems, the Internet Protocol (IP) is selected as the preferred network layer protocol. The IP packets (e.g. versions 4 and 6) include the IPQoS information. There are two main trends in the industry to support the IP QoS. The first method uses an end-to-end flow control. This method is called the Integrated Services (Int-Serv), and uses a ReSerVation setup Protocol (RSVP) to pass the QoS request from the end system to each intermediate router along the data path. An admission control algorithm at each router along the path verifies the resources needed to provide the requested QoS. A policy control unit performs the administration. The Int-Serv approach results in lowering the throughput and it is somewhat complicated and not easily scalable.

The second method moves the complexity of the operation to the edges of the network, while keeping the core simple. This is called the Differentiated Services (Diff-Serv) method where the traffic conditioning is done on a per-hop basis. The Diff-Serv method is preferred as it is easy to implement and scalable. It is to be noted that Diff-Serv does not provide the same level of guaranteed QoS as Int-Serv.

A wireless communication system has to support a packet switched data in a circuit switched environment. Previously, for DLL protocols, packet data sessions were defined based on different application sessions and resources were assigned to each of them. According to the present invention the incoming traffic is considered as a combination of different IP flows with different QoS requirements (or Classes), called subflows. Thus, the packet data application sessions/flows is replaced with QoS subflows. Irrespective of the application which generated the IP flow, the flow is categorized based on the QoS requirements, or the CoS.

It is to be noted that prior art methods have to undo all the higher layers framing and to duplicate all the QoS classifications done at the higher layers in order to differentiate among different applications, and this is contrary to the layering scheme strategy.

FIG. 2 shows the UMTS radio interface protocol architecture layer proposed for a 3G wireless network and is reproduced from the Third Generation Partnership Proposal Technical Specification 25.301 (3GPP TS 25.301).

Layer-1, or the Physical Layer 20 of the UMTS radio interface is responsible for coding and modulation of data transmitted over the air.

Layer-2, or the Data Link Layer 30 is subdivided into a Radio Link Control (RLC) sublayer 70 and a Medium Access Control (MAC) sublayer 80. The separation in MAC 80 and RLC 70 sublayers is motivated by the need to support a wide range of upper layer services, and also the requirement to provide high efficiency and low latency data services over a wide performance range, i.e. from 1.2 Kbps to greater than 2 Mbps. Other motivators are the need for supporting high QoS delivery of circuit and packet data services, such as limitations on acceptable delays and/or data BER (bit error rate), and the growing demand for advanced multimedia services. Each multimedia service has different QoS requirements. Data Link Layer 30 also comprises a C-Plane Signaling and a U-Plane Information for separating the information from control signals.

The RLC 70 of the radio interface protocol architecture 100 for the UMTS shown in FIG. 2, receives data packets from the higher layers, such as IP, through Service Access Points (SAP) 13, and delivers RLC frames to the MAC sublayer 80. The RLC frames are queued into logical channels 15. At the MAC sublayer 80, the RLC frames are multiplexed onto transport channels 25. The transport channels 25 are the interface of the Physical Layer 20 to the Data Link Layer 30. In fact, Data Link Layer 30 functions are divided in two parts: Physical Layer Independent Convergence Function (PLICF) handled in the RLC 70, and Physical Layer Dependent Convergence Function (PLDCF) included in the MAC 80. It is assumed that there is one instance of RLC 70 for each data application/session.

FIG. 3 illustrates the DLL protocol according to the invention which includes direct support for the IP protocol and isolates the logical operation of the Network Layers from the Physical Layer 20. The structure of the Data Link Layer 30 shown in FIG. 3, is designed to support IP networking without adding any limitations that are not related to the wireless systems. The new Data Link Layer 30 design may be viewed as an interface between the IP layer and the Physical Layer 20, and can accommodate a variety of Classes of Service (CoS) having different Quality of Service (QoS) requirements.

As indicated before, the IP packets 45 include the IP Quality of Service (IPQOS) information. The DLL protocol 100 has a scheme to map the IPQoS requirements to Classes of Service (CoS). Each CoS is separated inside the DLL 30 and directed to a dedicated QoS plane.

The architecture of FIG. 3, comprises a subflow processing module 71 for receiving the IP packets through check point 11 and redirecting the IP packets 45 to different instances of the QoS planes (1 . . . n). The subflow processing module 71 checks the IP packets 45 and categorizes them into different subflows, or equivalently QoS planes (1 . . . n). For example, if the Diff-Serv method is used, the subflow processing module 71 may simply peak into the IP packets 45 to map the QoS requirements, or CoS included in the IP packet 45 to one of the QoS planes (1 . . . n) in the RLC 70. If the Int-Serv is used, the subflow processing module 71 involves in the RSVP, or any admission protocol, and redirects each IP packet 45 to one of the QoS planes (1 . . . n) based on the agreed QoS requirements. It is to be noted that there is one dedicated subflow processing module 71 for each User Equipment (UE).

Each QoS plane (1 . . . n) is configured to handle a CoS or equivalently a range of QoS requirements. Each QoS plane (1 . . . n) includes a Data-RLCs (D-RLC) (14-1 . . . 14-n) and its associated Control-RLCs (C-RLC) (12-1 . . . 12n). As shown before, the D-RLCs (14-1 . . . 14-n) and C-RLCs (12-1 . . . 12-n) receive the IP data packets 45, create the RLC PDUs, or RLC frames and deliver the RLC frames over logical channels 15 to the MAC sublayer 80 to be multiplexed onto different transport channels 25.

The inclusion of an associated Control-RLC 12 is necessary because data are handled based on their QoS requirements and consequently, the associated control signals must be treated at least the same to meet those requirements. For example, it is not acceptable to send control signals associated with a higher priority to propagate with a lower priority traffic. This may result in violation of proper treatment of the QoS requirements corresponding to the transmitted data. Still, increasing the priority of the Control-RLC 12 to indirectly increase the priority of associated data, is permitted. This is especially important in the case where control signals are needed to insure connectivity, although the data might be sent as in the best effort delivery.

In contrast with the fixed Radio Link Protocols (RLPs) defined for the "cdma2000" standard, the RLCs are totally re-configureable, i.e. the segment size, the number of retransmission, etc. Thus, QoS planes (1 . . . n) are reconfigurable to fit corresponding classes of service (CoS).

There are a number of entities inside a QoS plane (1 . . . n) that can be dynamically reconfigured, or fine tuned and optimized to meet specific QoS requirements of a CoS. This includes, segment size at the Segmentation, Concatenation and Reassembly (SCR) module of the RLC, resource assignments, logical channel to transport channel mapping, priorities, etc. Moreover, the type of the error recovery used in each QoS plane (1 . . . n) varies and depends on the QoS requirements in that particular plane.

FIG. 4 illustrates the process of mapping the received IP packets 45 into RLC PDUs, or RLC frames according to the DLL protocol 100. As discussed before in connection with FIG. 3, the subflow processing module 71 is responsible for receiving the IP packets 45 and extracting the IP QoS requirements included in each packet. IP QoS requirements are translated into classes of service (CoS). The subflow processing module 71 also initiates a QoS plane (1 . . . n), or subflow, for each CoS under the supervision of a Radio Resource Control (RRC) unit 44. Each QoS plane (1 . . . n) includes dedicated D-RLC (14-1 . . . 14-n) and C-RLC (12-1 . . . 12-n) instances.

Based on the QoS classification obtained, the QoS subflow processing module 71 redirects the IP packets 45 to the proper QoS plane (1 . . . n). Packets without IP QoS classification are defaulted to a "best effort" data plane. It should be noted that any network layer protocol other than the IP 2 0 may be supported by including the corresponding functionality in the QoS subflow processing module 71. There is one corresponding QoS subflow processing module 71 for each User Equipment (UE). Moreover, the receiving and the transmitting ends comprise identical QoS planes (1. . . n).

The method of generating radio link control protocol data units (RLC PDUS), or RLC frames will be now discussed in connection with RLC frame 77. As shown in FIG. 4, an optional length (LEN) indicator 47 is added to each IP packet 45 by the subflow processing module 71. The length indicator 47 is added to enable reconstruction of the original IP packet 45 by a Segmentation, Concatenation and Reassembly (SCR) module which is part of the RLC at the receiving end (not shown). In the case when the length indicator of the IP header is used, the LEN indicator 47 is not needed. In any event, the resulting packet 46 is called an "augmented IP packet".

The SCR module of the D-RLC (14-1 . . . 14-n) chops the augmented IP packet 46 into smaller size packets, which are more suitable for error recovery and retransmission. These smaller size packets, or "sequence frames" are denoted with 74, on FIG. 4. The size of a sequence frame 74 may be variable and dynamically optimized in different QoS planes (1 . . . n), based on the QoS requirements and on the radio link conditions.

A start of message (SOM) bit field 75 and a sequence number field 76 are then added to the payload 46. A logic "1"

for example in SOM bit 75 could be used to identify the start of the sequence frame 74. The sequence number is necessary in the retransmission of unsuccessful frames.

A QoS field 73 is also added to each sequence frame 74 to differentiate various frames directed to different QoS planes (1 . . . n). This field is denoted as "QoS" in FIG. 3, and contains the QoS plane number of the frame. This information is necessary for the multiplexing/demultiplexing process performed between peer Medium Access Control (MAC) layers. Specifically, field 73 is needed at the MAC sublayer at the receiving end for directing the received frames to the proper QoS plane.

One important feature in the SCR module (which is part of the RLC), is the "concatenation" of short data messages. In the case where the amount of data in each IP packet 45 is very small with respect to the size of the RLC frame 77, i.e. a 10 ms frame load, the SCR module concatenates a number of short messages into one RLC frame 77. This framing process performed at the Link Layer 30 level, is called "multiframing".

A frame check sequence (FCS) 79 and flags 68 and 78 may be added. The RLC frame 77 are then delivered to the MAC instances over the logical channels 15.

The point-to-point link connectivity of each QoS plane (1 . . . n) is maintained by peer RLC instances located at both the transmitting and the receiving sides.

The RLC Protocol Data Units (RLC-PDUs), or RLC frames 77 are delivered to the MAC sublayer 80 to be multiplexed onto different transport channels 25 and prioritized based on their QoS requirements. The Radio Resource Control (RRC) module 44 controls this operation.

In the receiving side, the MAC sublayer demultiplexes the received frames and redirects them to the corresponding QoS planes based on their QoS plane number field 73.

According to the invention, the IP layer can sit on top of the new Data Link Layer 30 and the DLL protocol 100 provides direct support for any network layer protocol with no need for any additional protocol as an interface. This greatly reduces the limitations imposed by other protocols, which are not designed for the wireless systems.

The above description was made for the forward direction of transmission, i.e. from the transmitting end to the receiving end. It is to be understood that the operations are similar for the reverse direction.

Numerous modifications, variations, and adaptations may be made to the particular embodiments of the invention described above without departing from the scope of the invention defined in its claims.

The embodiment of the invention in which an exclusive property or privileges is claimed are defined as follows:

1. A Data Link Layer (DLL) protocol for direct support of a network layer protocol in the Universal Mobile Telecommunications System (UMTS), comprising:

at a transmitting end of the UMTS, a plurality of Quality of Service (QoS) planes, each of said QoS planes processing a QoS oriented data packet according to a Quality of Service (QoS) requirement, and providing a radio link control (RLC) frame;

a subflow processing module for receiving a network layer protocol data packet, converting said network layer protocol data packet into said QoS oriented data packet, and directing said QoS oriented data packet to one of said QoS planes according to QoS information in said network layer protocol data packet; and an interface between a Data Link Layer and a physical layer for receiving said RLC frame and transmitting same to said physical layer.

2. A DLL protocol as claimed in claim 1, wherein said network layer protocol is Internet Protocol (IP).

3. A DLL protocol as claimed in claim 1, wherein each said QoS plane comprises:

a Radio Link Control (RLC) instance for receiving said QoS oriented data packet and generating said RLC frame; and a Medium Access Control (MAC) instance for receiving said RLC frame over logical channels and multiplexing said RLC frames onto transport channels.

4. A DLL protocol as claimed in claim 3, wherein said RLC instance comprises a Data-RLC instance and a Control-RLC instance.

5. A DLL protocol as claimed in claim 4, wherein said Data-RLC instance comprises a segmentation, concatenation and reframing (SCR) module for receiving a plurality of said QoS oriented data packet, dividing same into sequence frames, and generating said RLC frame.

6. A DLL protocol as claimed in claim 5, wherein said RLC frame has a variable size, said size being dynamically optimized based on the conditions of the communication link.

7. A DLL protocol as claimed in claim 3, wherein said MAC instance comprises a multiplexer for receiving said RLC frame, and multiplexing same onto said transport channel according to said QoS requirement for transmission to said physical layer.

8. A DLC protocol as claimed in claim 3 further comprising a radio resource control (RRC) module for controlling said subflow processing module and the delivery of said RLC frames to said physical layer over said transport channels.

9. A DLL protocol as claimed in claim, wherein said radio resource control (RRC) unit also carries out controlling the mapping of said QoS requirement to a class of service (CoS) inside the DLL protocol.

10. A DLL protocol as claimed in claim 1, wherein said QoS plane is totally reconfigurable and accepts various types of error recovery selected according to said QoS requirement.

11. A DLL protocol as claimed in claim 1, further comprising, at the receiving end of the UMTS, a plurality of QoS planes which are substantially identical to those in the transmitting end of the UMTS, and a subflow processing module which is substantially identical to that in the transmitting end of the UMTS.

12. A method for direct processing a network layer protocol data packet for transmission over the UMTS wireless communication system, comprising the steps of:

separating the radio link control layer of the wireless communication system into a plurality of Quality of Service (QoS) planes, each of said QoS planes processing a QoS oriented data packet according to a QoS requirement, and generating a radio link control (RLC) frame;

processing said network layer protocol data packet by converting said network layer protocol data packet into said QoS oriented data packet and directing said QoS oriented data packet to one of said QoS planes according to QoS information in said network layer protocol data packet, and forwarding said RLC frame to a physical layer over a transport channel.

13. A method as claimed in claim 12, wherein said network layer protocol is Internet Protocol (IP).

14. A method as claimed in claim 12, wherein said step of separating comprises steps of:
   providing a plurality of Radio Link Control (RLC) instances, a RLC instance for each said QoS plane, said RLC instance for receiving said QoS oriented data packet and generating said RLC frame; and
   providing Medium Access Control (MAC) instances for receiving said RLC frame and multiplexing same onto said transport channels.

15. A method as claimed in claim 12, wherein said step of processing comprises steps of mapping said QoS requirement to a class of service (CoS), and separating said CoS inside the DLL protocol into said QoS planes.

16. A method as claimed in claim 15, wherein said step of processing further comprises steps of dividing said QoS oriented data packet into smaller sequence frames and reframing same into said RLC frame.

17. A method as claimed in claim 16, wherein said step of processing comprises a step of adding a length indicator, a beginning of frame field, a sequence number field, and a QoS plane number to said network layer protocol data packet.

18. A method as claimed in claim 12, wherein said step of generating said RLC frame provides a dynamic optimization of the size of said RLC frame based on the conditions of the communication link, for enhancing the quality of the air transmission.

19. A method as claimed in claim 12, further comprising a step of regulating the delivery of said RLC frames to said physical layer over said transport channel.

20. A method as claimed in claim 12, wherein the step of processing comprises a step of multiframing.

\* \* \* \* \*

UNITED STATES PATENT AND TRADEMARK OFFICE
CERTIFICATE OF CORRECTION

PATENT NO.    : 6,477,670 B1                                         Page 1 of 1
DATED         : November 5, 2002
INVENTOR(S)   : Nima Ahmadvand It is certified that error appears in the above-identified patent and that said Letters Patent is hereby corrected as shown below:

Column 8,
Line 36, should read:
9. A DLL protocol as claimed in claim 8, wherein said radio resource control (RRC) unit also carries out controlling the mapping of said QoS requirement to a class of service (CoS) inside the DLL protocol.

Signed and Sealed this

Seventh Day of October, 2003

JAMES E. ROGAN
*Director of the United States Patent and Trademark Office*